United States Patent
Goodwater et al.

(10) Patent No.: US 6,173,491 B1
(45) Date of Patent: Jan. 16, 2001

(54) METHOD FOR REPLACING A TURBINE VANE AIRFOIL

(75) Inventors: Frank Goodwater; David Kang, both of Reno, NV (US)

(73) Assignee: Chromalloy Gas Turbine Corporation, San Antonio, TX (US)

( * ) Notice: Under 35 U.S.C. 154(b), the term of this patent shall be extended for 0 days.

(21) Appl. No.: 09/373,277

(22) Filed: Aug. 12, 1999

(51) Int. Cl.⁷ .................................................. B23P 15/00
(52) U.S. Cl. ...................................................... 29/889.1
(58) Field of Search ............................ 29/889.1, 889.7, 29/402.03, 402.08, 402.05, 402.06, 402.11, 402.12

(56) References Cited

U.S. PATENT DOCUMENTS

| | | | |
|---|---|---|---|
| 4,883,216 | * 11/1989 | Patsfull | 29/889.1 |
| 5,197,190 | * 3/1993 | Coolidge | 29/889.1 |
| 5,269,057 | * 12/1993 | Mendham | 29/402.08 |
| 5,444,911 | 8/1995 | Goodwater et al. | 29/889.7 |
| 5,522,134 | * 6/1996 | Rowe et al. | 29/402.08 |
| 5,554,837 | * 9/1996 | Goodwater et al. | 219/121.63 |
| 5,690,469 | * 11/1997 | Deel et al. | 29/889.1 |
| 5,732,468 | 3/1998 | Galley et al. | 29/889.1 |
| 5,758,416 | 6/1998 | Riverman et al. | 29/889.1 |
| 5,813,832 | 9/1998 | Rasch et al. | 415/200 |

\* cited by examiner

*Primary Examiner*—I Cuda
(74) *Attorney, Agent, or Firm*—Mitchell D. Bittman (57) ABSTRACT

A method for refurbishing turbine engine vanes in which the airfoils are removed and replaced. The original configuration of the vanes can be modified from a single casting or welded pair to a multi-piece component assembly comprising individual airfoil segments attached to the inner and outer platforms. The component assembly allows replacement of airfoils and/or platforms with improved castings in the form of improved alloys, improved physical geometry, or both. Modifications can be made in the vane class area without the need to modify the airfoil contour by brazing or other contour alteration processes. According to the method, the platforms are separated from the airfoils, the openings in the platforms are sealed, new airfoil sockets are cut into the platforms, and the vane is reassembled.

14 Claims, 6 Drawing Sheets

METHOD FOR REPLACING A TURBINE VANE AIRFOIL

CROSS-REFERENCE TO RELATED APPLICATION

This application is related to U.S. patent application Ser. No. 09/375,124 entitled "Laser Cladding a Turbine Engine Vane Platform," filed Aug. 16,1999 the contents of which are incorporated herein by reference.

BACKGROUND OF THE INVENTION

The present invention relates to a method for replacing airfoils on turbine vanes, and more particularly, to a method of replacing airfoils such that they can be upgraded and/or repositioned within a turbine vane platform.

Components of gas turbine engines, especially those positioned within the hot section of the engine, are exposed to a harsh operating environment. Extreme operating temperatures, accompanied by repeated temperature cycling during engine warm-up, operation and cool-down can quickly deteriorate engine components. These components include HPT (high-pressure turbine) vane segments which can become damaged or worn such that they require repair or replacement.

A turbine engine vane segment is typically comprised of an outer and inner platform, between which one or more airfoils are positioned. The airfoils are either cast as a single unit with one or both of the platforms or are separately welded or brazed to the platforms in the form of a component assembly. Some turbine vanes are complex castings, comprising two, three or more airfoils integrally cast to the inner and outer platforms. Another form of turbine vanes is paired assemblies. A paired assembly is a vane in which a single airfoil is integrally cast between two platforms. Two of these castings are brazed or welded along mateface joints to create a doublet vane assembly.

It would be desirable to be able to modify these vanes from a single casting or welded or brazed pair to a multi-piece assembly consisting of individual airfoil segments attached to inner and outer platforms to facilitate subsequent vane repairs and airfoil replacement.

Advances in material science often provide improved materials for use as airfoil members, and may provide airfoils having sizes which differ from those used in existing vanes. In addition, airfoil positioning within the vane, i.e. location on the vane segment platform, might require adjustment. For example, an adjustment to the nozzle opening area between adjacent vanes (hereinafter the "class area") may be required or desirable.

Components in gas turbine engines are air cooled and are fabricated from expensive materials. These components are also costly to assemble. As a result, it is desired to be able to efficiently repair the damage, while providing for upgraded components and materials within each vane, such that as much of the original materials as possible can be reused.

Conventional airfoil replacement repair procedures involve separating the platforms by cutting the airfoils therefrom. This procedure retains a stub on each platform where the airfoils are cut out. The replacement airfoils are then typically welded to the stubs using electron beam welding techniques. Because the new airfoils must be positioned on the existing stubs, the positioning of the new airfoils is restricted. Also, because airfoil stubs are retained, complete refurbishment of the platform gaspath surfaces by an automated process is not possible. The irregularly contoured stub protruding from each platform requires that brazing and contouring of the platforms be done by hand. It is desirable, however, to automate as many refurbishment operations as possible in order to minimize repair prices and time.

Another airfoil replacement procedure has been applied to HPT turbine vanes that were originally created as component assemblies as described above, in which the airfoil castings are brazed into pockets in the separately cast platforms. When repairing a component assembly vane, the entire assembly can be heated to a temperature sufficient to melt the brazed joint, allowing the components to be pulled apart. This procedure has been described in U.S. Pat. No. 5,444,911 to Goodwater et al. Alternatively, the airfoil can be cut from the platforms, followed by subsequent machining operations to restore the platform pocket. This alternative procedure has been described in U.S. Pat. No. 5,813,832 issued to Rasch et al. However, using either procedure, the replacement airfoil is limited to placement within the existing socket in the platform, thereby preventing the relocation of airfoils, i.e. class size alteration, or the use of airfoils which are of a different size from the original.

SUMMARY OF THE INVENTION

The present invention provides a method for refurbishing turbine engine vanes in which the airfoils are removed and replaced. The original configuration of the vanes is modified from a single casting or welded pair to a multi-piece component assembly comprising individual airfoil segments attached to the inner and outer platforms. The component assembly allows replacement of airfoils and/or platforms with improved castings. The improvements can be in the form of improved alloys, improved physical geometry, or both. The method of the present invention also allows modifications to be made in the vane class area without the need to modify the airfoil contour by brazing or other contour alteration processes.

For example, directionally solidified or single crystal replacement castings can be easily incorporated into the new vane assembly using the method of the present invention. Also, removing the airfoil stubs present after separating the vane platforms and sealing cooling holes and other passages in the platforms facilitates the automation of gaspath surface contouring operations. The present invention also makes subsequent repairs on the vane component assembly easier because performing airfoil replacement on a component assembly vane is simpler than performing this repair on a cast assembly. The method of the present invention therefore reduces repair, time and costs, and allows for component upgrade and vane performance optimization.

According to the present invention a method of repairing a turbine vane having at least one platform and at least one airfoil, the at least one platform having at least one opening, is provided in which the at least one platform is separated from the at least one airfoil, the openings in the at least one platform are sealed, at least one airfoil socket is cut into the at least one platform, and the vane is reassembled from the at least one platform and at least one replacement airfoil.

The present invention also provides a method of repairing a turbine vane having at least one platform and at least one airfoil, each of the platforms having at least one opening, in which the at least one platform is separated from the at least one airfoil, the openings in the at least one platform are plugged, a gaspath surface to the at least one platform is automatically restored, at least one airfoil socket is cut into the at least one platform, and the vane is reassembled from the at least one platform and at least one replacement airfoil.

In addition, the present invention provides a method of repairing a turbine vane having at least one platform and a plurality of airfoils, the distance between two of the plurality of airfoils defining a first class area, each of the platforms having at least one opening, in which the at least one platform is separated from the plurality of airfoils, at least one of the openings in the at least one platform is sealed, the openings including a plurality of airfoil openings corresponding to the plurality of airfoils. At least one airfoil socket is cut into the at least one platform, at least one of the airfoil sockets being cut at a location different from a corresponding airfoil opening. The vane is then reassembled from the at least one platform and at least one replacement airfoil.

Other features and advantages of the present invention will become apparent from the following description of the embodiments of the invention which refer to the accompanying drawings.

BRIEF DESCRIPTION OF THE DRAWINGS

FIG. 5 is a perspective view of vane platforms with new sockets cut through.

For the purpose of illustrating the invention, there is shown in the drawings a form which is presently preferred, it being understood, however, that the invention is not limited to the precise arrangement and instrumentality shown.

DETAILED DESCRIPTION OF THE EMBODIMENTS OF THE INVENTION

Initially, it is noted that the terms "repair", "upgrade" and "refurbish" are used interchangeably herein to refer to the process of disassembling a turbine engine vane and replacing its airfoils.

Figure 1:
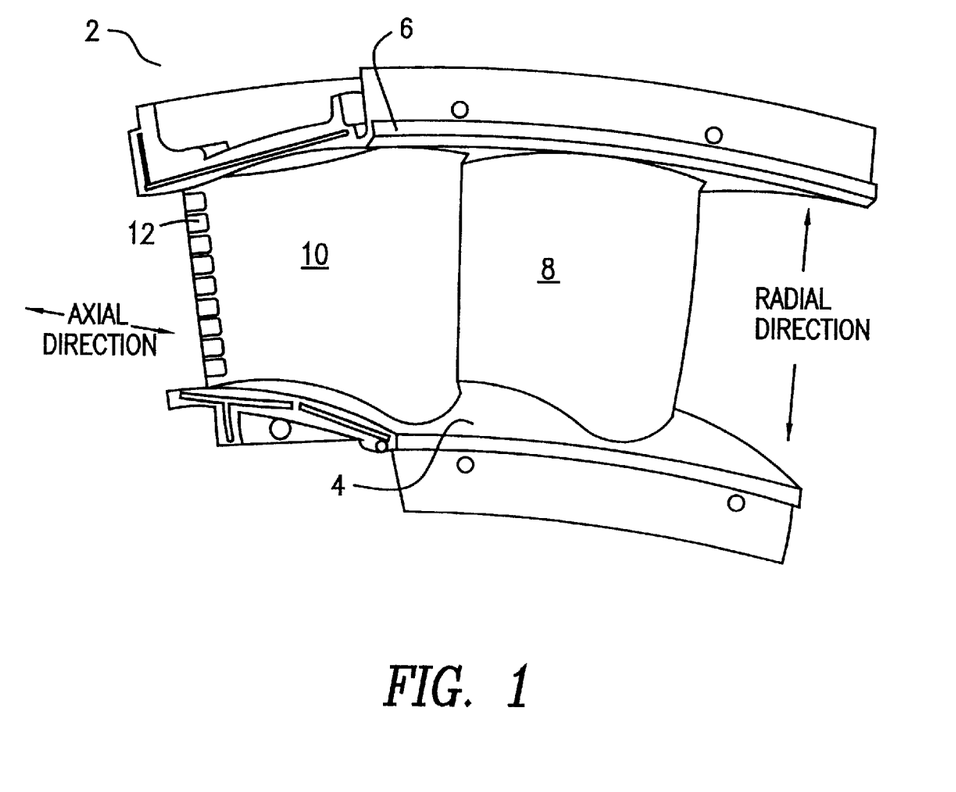
FIG. 1 is a perspective view of a turbine vane upon which the method of the present invention is performed.

Referring to the drawing figures which like reference numerals refer to like elements, FIG. 1 is a perspective view of a turbine vane upon which the method of the present invention is performed. Turbine vane 2 which will be repaired according to the method of the present invention is comprised of inner platform 4, outer platform 6, lead airfoil 8 and trailing airfoil 10. Prior to repair, lead airfoil 8 and trailing airfoil 10 are either cast as an integrated unit with one or more of inner platform 4 and outer platform 6, or are welded and/or brazed to one or more of inner platform 4 and outer platform 6. It should be noted that although FIG. 1 shows two airfoils, 8 and 10, a turbine vane can be comprised of any number of airfoils. Cooling slots 12 are positioned at the trailing edge of lead airfoil 8 and trailing airfoil 10.

Figure 2:
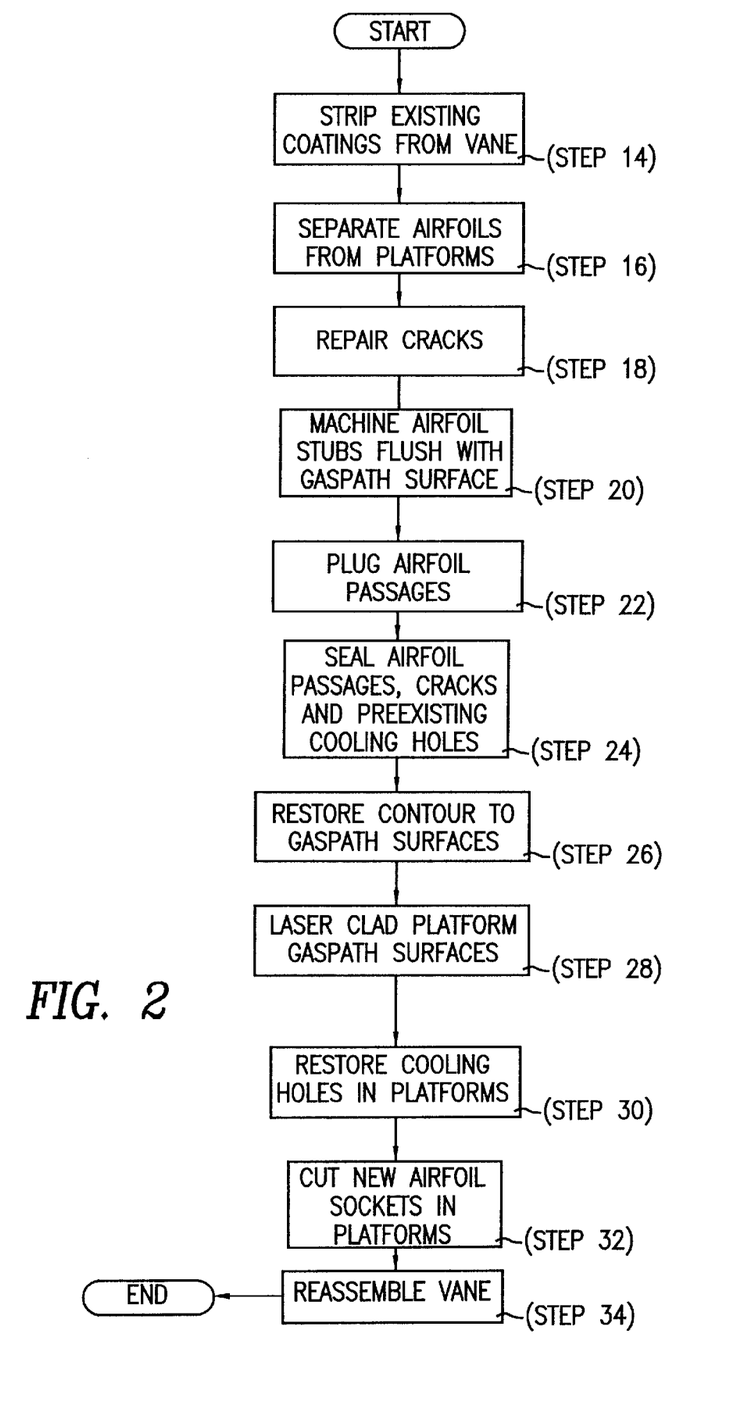
FIG. 2 is a flow chart of an airfoil replacement method of the present invention.

The airfoil replacement method of the present invention is now described with respect to the flow chart shown in FIG. 2.

Prior to airfoil replacement, vane 2 is measured in detail to ensure that the completed vane has substantially the same dimensions as the original. For example, the curvature in the axial and radial directions of the gaspath surfaces, i.e. the inner sides of the platforms, can be measured by comparing the contour to that of new parts, as with other platform dimensions.

A vane being retrofitted with replacement airfoils is first subjected to treatment to strip existing coatings from the vane (step 14). Methods for stripping these coatings are known and include, for instance, an initial gritblast operation followed by immersion in a heated solution of 50% nitric/ 50% phosphoric acid. A subsequent gritblast after rinsing and drying the vanes can complete the removal of the coating. Depending on the specific coating being removed, additional cycles in other acids may be required.

Figure 3:
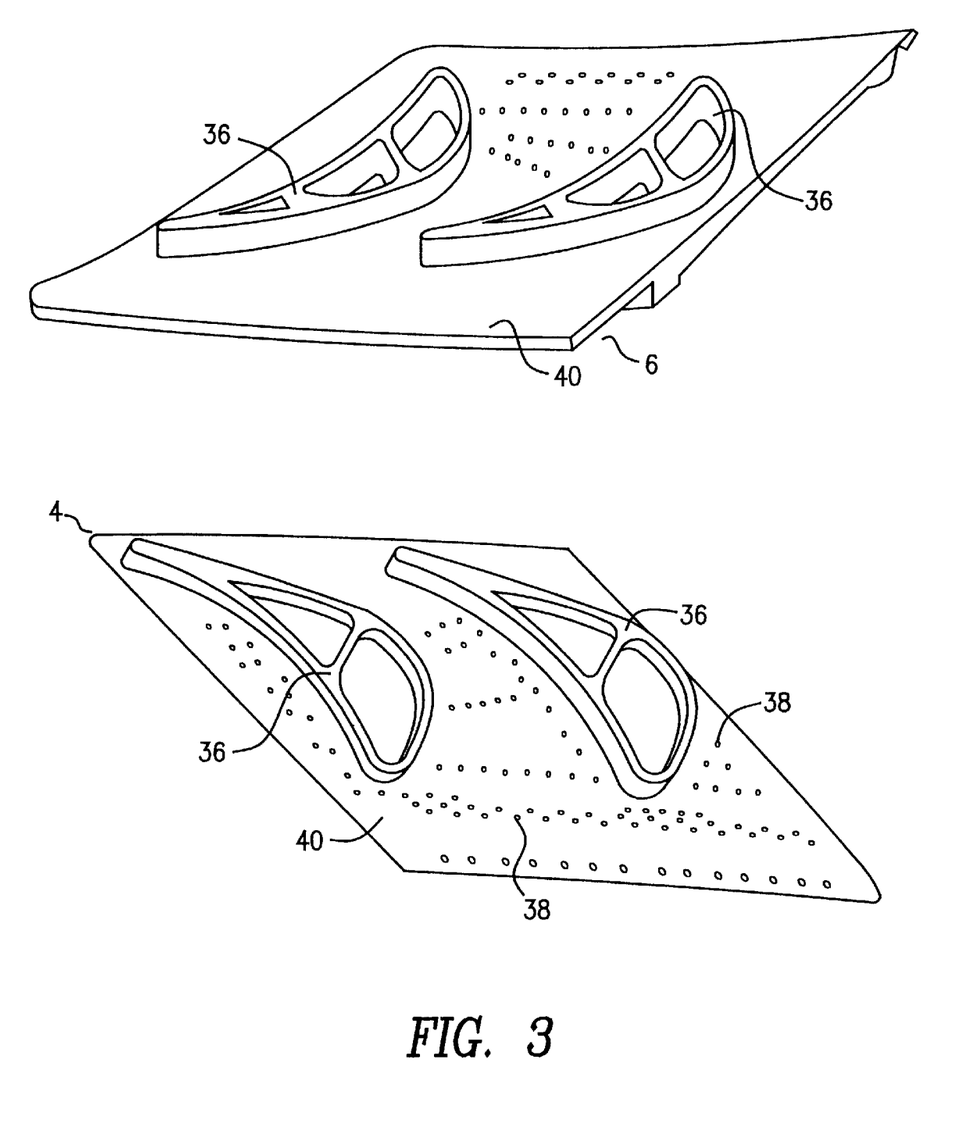
FIG. 3 is a perspective view of vane platforms with the airfoils removed to form airfoil stubs.

Once the vane is stripped of coatings, airfoils 8 and 10 are separated from inner platform 4 and outer platform 6. Where the vane to be repaired is a component assembly vane, the platforms and airfoils can be separated by heating the entire assembly to a temperature sufficient to melt the braze joints. Alternatively the airfoils can be cut from the vanes leaving airfoil stubs 36 as shown in FIG. 3.

In the case where the airfoils are integrally cast with the platforms, separation is achieved by cutting airfoils 8 and 10 from vane 2 such that stubs from airfoils 8 and 10 protrude from inner platform 4 and outer platform 6. FIG. 3 shows inner platform 4 and outer platform 6 with airfoils 8 and 10 removed to form airfoil stubs 36.

It should be noted that significant cracks in the platform, including cracks along the original mateface welds can be manually notched, prepared and welded prior to removing airfoils 8 and 10 from vane 2 (step not shown). In addition, prior to removing airfoils 8 and 10, optionally, vane 2 can be manually heated and straightened to correct distortions in vane 2 caused by thermal cycling and caused by initial welding operations (step not shown).

Once airfoils 8 and 10 are removed from platforms 4 and 6, the basic repair sequence for inner platform 4 and outer platform 6 is the same. Once platforms 4 and 6 are separated, a second welding operation is performed to repair any remaining cracks in the platforms, and to plug all cooling holes 38 in platforms 4 and 6 (step 18). Known welding techniques such as TIG (tungsten inert gas) welding can be used.

Airfoil stubs 36 are then machined flush with the gaspath surface 40 on platforms 4 and 6 (step 20). Machining can be accomplished, for example, by belt sanding airfoil stubs 36.

Figure 4:
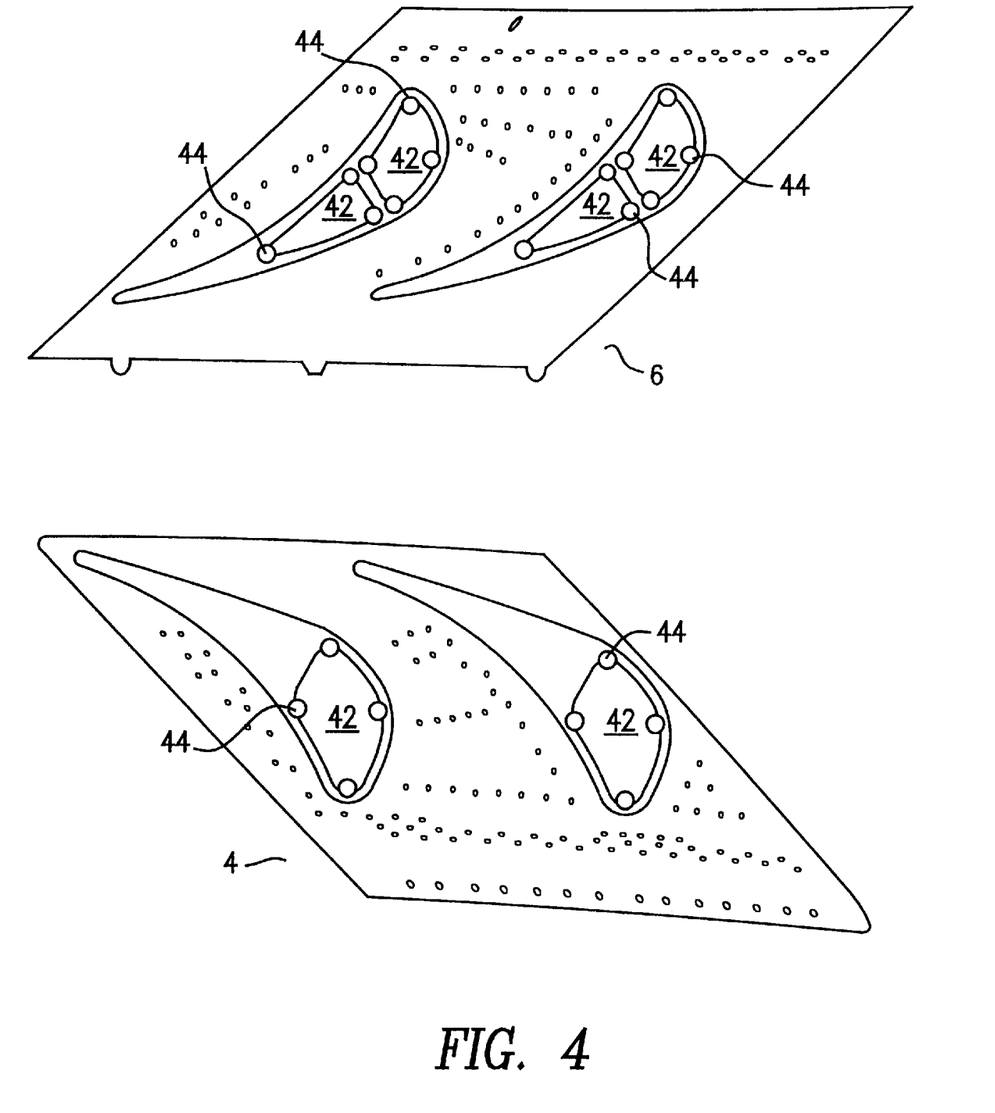
FIG. 4 is a perspective view of vane platforms having plugged platform openings.

The airfoil passages in platforms 4 and 6 are then plugged (step 22). FIG. 4 shows a perspective view of inner platform 4 and outer platform 6 with plugged platform openings. Plugs 42 are machined to fit into the corresponding airfoil openings in the platform, and tack welds 44 are used to hold plugs 42 in place. The plugs used are cut from alloy materials which are compatible to the platform base alloy, ie. the plug alloy will weld or braze uniformly with the platform base alloy. Typically the base element of the alloy for the plug is the same as that of the alloy for the platform, ie. the Ni or Co base is the same. For X-40 cobalt alloy platforms L-605 cobalt alloy plugs are useful, while for nickel alloy platforms nickel alloy plugs, ie. Inconel 625 is useful.

Platforms 4 and 6 are then processed through a vacuum cleaning cycle which is used to prepare most types of turbine vanes for brazing operations. If the parts are not completely clean braze will not flow properly, will not diffuse into the part and adhere properly, and will become contaminated. A suitable cleaning cycle includes first fluoride cleaning, which takes place in an atmospheric furnace wherein a chemical reaction takes place that reduces (breaks up) aluminum and titanium oxides on the vane surfaces and in exposed cracks. The next step is a hydrogen vacuum clean wherein the hydrogen gas acts to reduce chromium oxides to pure chromium. The final step is a vacuum clean cycle to pull any residual oxides (Al, Ti, Cr) from the surface of the parts, so that the parts are finally ready for braze.

Gaspath surfaces 40 are then brazed, using known techniques, to apply a layer of braze material to seal the airfoil passages plugged by plugs 42, seal minor cracks in platforms 4 and 6, and seal cooling holes 38 to obtain a relatively smooth surface (step 24).

Platforms 4 and 6 are then machined, using known machining processes (e.g. contour milling, automated belt sanding, manual belt sanding), to restore the correct, i.e. originally specified, contour to gaspath surfaces 40, and to restore platform dimensions as measured prior to the airfoil replacement operation (step 26). Gaspath contouring is easily automated using known automated machining techniques since platforms 4 and 6 are substantially smooth once airfoil stubs 36 are machined flat. Vacuum heat treatment operations can also be performed along with the manual machining steps. Nickel and cobalt based superalloys have complex, closely controlled crystal structures and microstructures. Both can be affected by the high temperatures seen during engine run, and by high temperature repair operations such as welding, brazing, vacuum cleaning, etc. At various times during the repair process specific heat treatments must be performed to restore the microstructure to original conditions, or adjust it as an interim step to facilitate other operations (such as performing an initial stress relief prior stress relief prior to a weld operation). In general, all of these heat treatments are performed in vacuum furnaces in order to prevent any surface oxidation or other contamination.

Platforms 4 and 6 are then placed into an appropriate fixture in preparation for laser cladding of gaspath surfaces 40 (step 28). Platforms 4 and 6 are heated to an appropriate temperature, for example, 1600° F, and laser clad with a super alloy powder. Laser cladding is a process as is generally described in U.S. Pat. Nos. 5,477,026 and 5,554,837. Laser cladding can be carried out with the same composition as the base alloy of the platform, e.g. an X40 powder on an X40 platform or it can be an upgraded composition to improve performance, e.g. a 50/50 cobalt nickel powder mix on a cobalt base alloy platform.

Laser cladding is a welding operation which applies a surface to a base material in which the surface has mechanical properties matching those of the base material. Also, laser cladding can improve the mechanical properties of, i.e., strengthen, the surface of the base material by cladding the base material with an alloy or alloy mix having properties superior to those of the base material. In particular, gaspath surfaces 40 can be clad to improve the surface properties of platforms 4 and 6 beyond those of the platform base materials.

At this point, platforms 4 and 6 are completely sealed with little or no evidence of there having previously been airfoils attached thereto or cooling holes therethrough.

If necessary, platforms 4 and 6 can optionally receive additional vacuum heat treatments. Machining operations are then carried out to ensure compliance with the original dimensions (step not shown).

Once sealed and laser clad, cooling holes 38 are then restored to platforms 4 and 6. Cooling hole restoration can be accomplished using known techniques such as, for example, by YAG laser drilling (step 30), or EDM (electro discharge machining).

Figure 5:
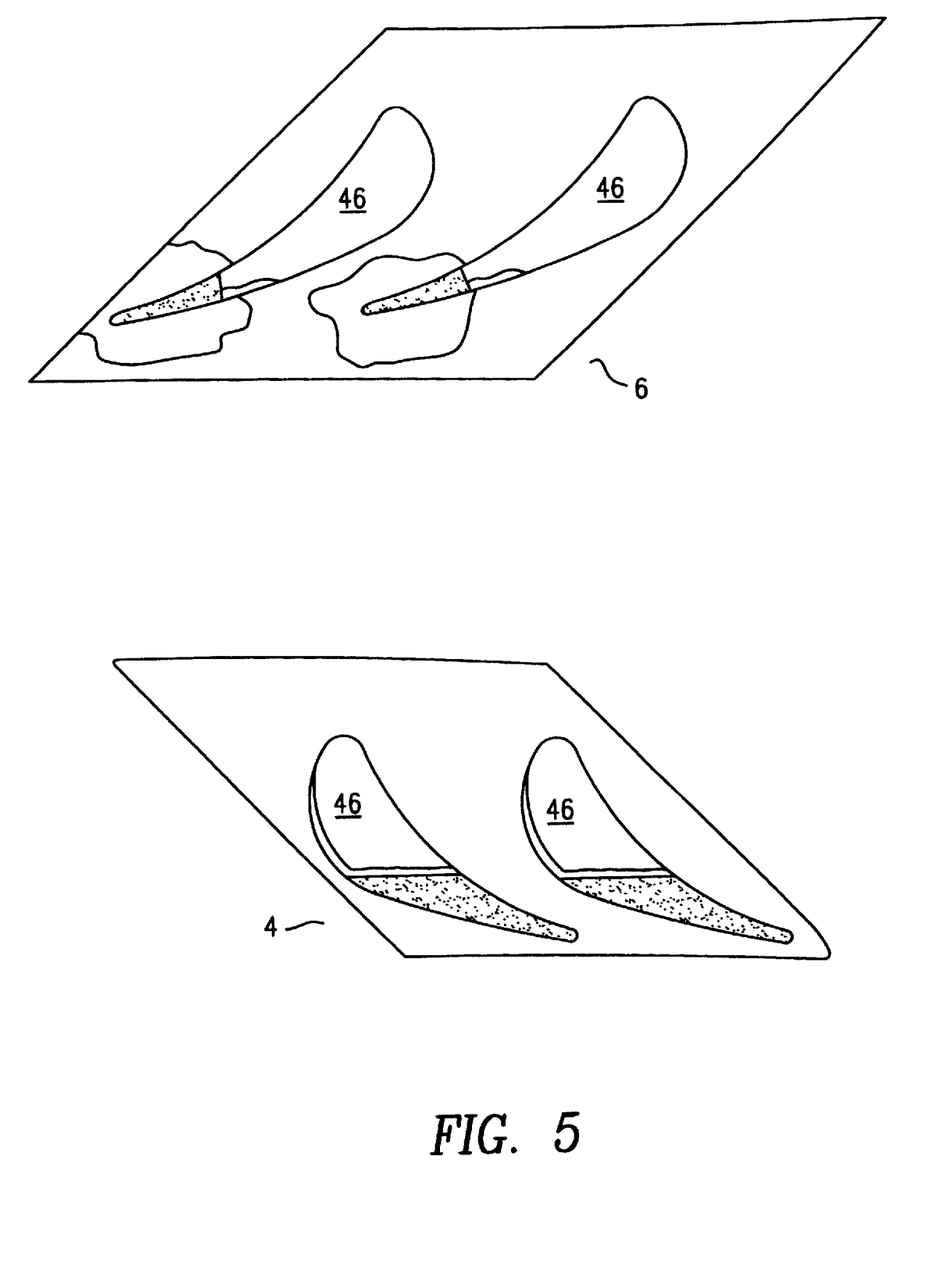

At this point, platforms 4 and 6 are ready to have airfoil sockets cut. Where plugs have been inserted, generally the entire plug area is cut out when cutting a new socket and additional platform material is also removed. An EDM (electro discharge machining) machine is used to cut sockets for the new airfoils into precise locations on inner platform 4 and outer platform 6 (step 32). Alternatively these sockets can be cut by laser, eg. a $CO_2$ or YAG laser. A $CO_2$ laser uses carbon dioxide gas to generate a continuous beam at a set frequency. A YAG laser emits a pulsed beam, generated by a yittrium, aluminum, garnet crystal, which is excited by flash lamps. $CO_2$ lasers are generally used for cutting or welding applications, and YAG lasers are generally used for hole drilling or cutting. FIG. 5 shows an example of platforms 4 and 6 with sockets 46 cut through.

Because airfoil sockets 46 are cut into completely sealed platforms 4 and 6, airfoil sockets 46 can be repositioned on platforms 4 and 6 in a different location than during the original manufacture of vane 2. This allows extreme flexibility such that different sized airfoils, as compared with the original airfoils, can be used, and the class area can also be adjusted to optimize the performance of vane 2 within the turbine engine.

Platforms 4 and 6 are then cleaned, and vane 2 reassembled using new cast airfoils (step 34). During vane reassembly, the new cast airfoils are placed into position using sockets 46 and tack welded into place. The airfoils are permanently sealed into position in vane 2 by brazing them into place. Final machining and coating of vane 2 is performed to finish proper gaspath surfacing and other critical surfaces including the mate faces on each platform end, bolt flanges, top and bottom edges of the platforms, seals, etc.

Figure 6:
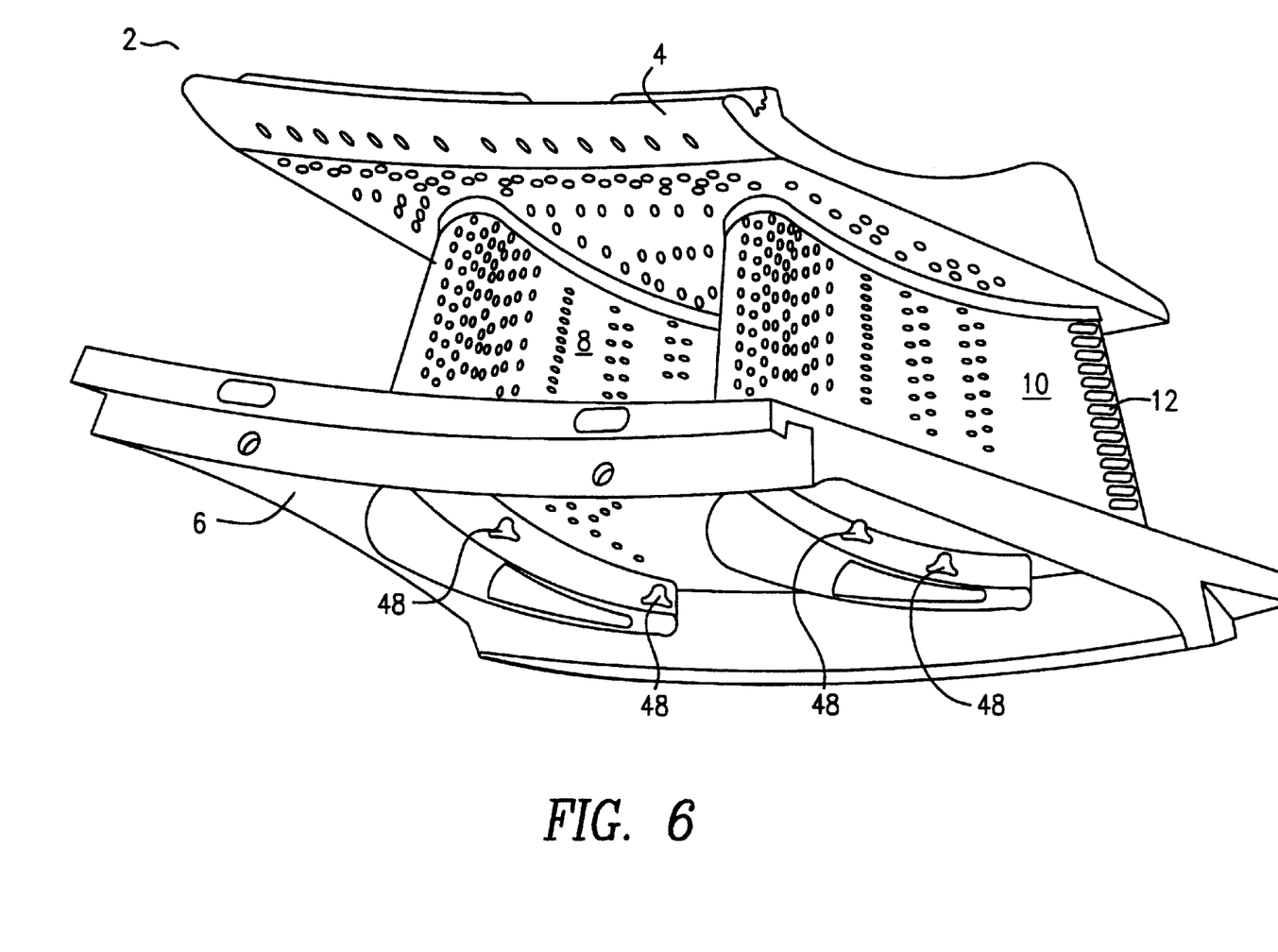
FIG. 6 is a perspective view of an assembled vane with airfoil segments welded to the platforms.

FIG. 6 shows a perspective view of an assembled vane 2 after airfoil segments have been tack welded to the platforms. In particular, lead airfoil 8 and trailing airfoil 10 are shown tack welded to inner platform 4 and outer platform 6 by airfoil tack welds 48.

The method of the present invention provides a comprehensively refurbished high-pressure turbine vane, produced at a significantly lower cost than a new vane. The component assembly vane allows significant modification from its original form, while minimizing the time the vane is out of service.

The method of the present invention also allows airfoil castings to be upgraded. For example, the present invention allows a cast nickel alloy replacement airfoil to be used in turbine vane 2. This is the case even where inner platform 4 and outer platform 6 are cobalt alloy or where the replaced airfoils were a cobalt alloy. Using prior art methods, it is not possible to successfully weld a cast nickel alloy replacement airfoil to a cobalt alloy stub because there would be cracking due to the dissimilar metals. In addition brazing to a stub does not provide suitable joint strength or sufficient material properties (strength, corrosion and hot oxidation resistance) for vane 2.

The present invention also allows platforms 4 and 6 to be upgraded. Thus, in addition to improving the replacement airfoil alloy, the platforms can also be replaced with an upgraded casting. This platform improvement can be in the form of an improved alloy and/or improved physical geometry. In addition, directionally solidified or single crystal replacement castings can be easily incorporated into the repaired (or upgraded) component assembly using the method of the present invention because the separation of vane 2 into individual component pieces and new cutting of airfoil sockets 46 allows individual piece parts to be used. Upgrades can be performed even if the same general alloy class is used. For instance, if a vane was cast from equiax nickel alloy, a DS or single crystal vane can be installed. Cfm}-3vanes which are originally made using DSR142 alloy could get CMSX4 single crystal airfoils.

Because new airfoil sockets 46 are cut into inner platform 4 and outer platform 6 to position the replacement airfoils, the class area can be changed without modifying the contour of the airfoils by adding or removing material from the airfoils as required in prior art vane repair methods.

Also, because the present invention removes the airfoil stubs and closes platform passages, gaspath surface contouring operations can be automated, thereby reducing cost and the time necessary to perform the repair on vane 2. Subsequent airfoil replacement is also simplified, thereby reducing cost and out of service time for vane 2 because airfoil replacement on a component assembly vane is less complicated than performing the replacement on an integrated cast assembly. This is particularly the case because vane 2, once repaired using the method of the present invention, converts an integrated cast assembly to a component assembly. Of course, the vane undergoing repair using the method of the present invention can be a component assembly.

Although the present invention has been described in relation to particular embodiments thereof, many other variations and modifications and other uses will become apparent to those skilled in the art. Therefore, the present invention is not limited by the specific disclosure herein.

What is claimed is:

1. A method of repairing a turbine vane, the turbine vane having at least one platform and at least one airfoil, the at least one platform having at least one opening, the method comprising the steps of:
   separating the at least one platform from the at least one airfoil;
   sealing the at least one opening in the at least one platform;
   cutting at least one airfoil socket into the at least one platform; and
   reassembling the vane from the at least one platform and at least one replacement airfoil.

2. The method of claim 1, wherein the separating step includes the steps of:
   cutting the at least one airfoil from the at least one platform to form at least one stub on each of the at least one platforms; and
   machining each of the stubs flush with a surface corresponding to at least one platform.

3. The method of claim 1, wherein the separating step includes heating the vane to a temperature sufficient to melt joints between the at least one airfoil and the at least one platform.

4. The method of claim 1, wherein the sealing step includes the steps of:
   plugging openings in the at least one platform, the openings including at least one airfoil opening; and
   brazing the at least one platform.

5. The method of claim 4, wherein the plugging step includes the steps of:
   machining a plug from a blank, the blank being a compatible material to the at least one platform and being formed to substantially fill a corresponding airfoil opening; and
   welding the plug into the corresponding airfoil opening on the at least one platform.

6. The method of claim 4, wherein the cutting step is accomplished using an EDM machine.

7. The method of claim 1, further including the step of laser cladding the at least one platform.

8. The method of claim 7, wherein the laser cladding step includes the steps of:
   heating the at least one platform; and
   cladding the at least one platform with a super alloy powder.

9. The method of claim 1, wherein said sealing step seals the at least one platform to form a corresponding at least one sealed platform, and further including the step of restoring cooling holes to the at least one sealed platform.

10. The method of claim 9, wherein laser drilling is used to restore the cooling holes.

11. A method of repairing a turbine vane, the turbine vane having at least one platform and at least one airfoil, the at least one platform having at least one opening, the method comprising the steps of:
    separating the at least one platform from the at least one airfoil;
    plugging the at least one opening in the at least one platform;
    restoring a gaspath surface to the at least one platform;
    cutting at least one airfoil socket into the at least one platform; and
    reassembling the vane from the at least one platform and at least one replacement airfoil.

12. The method of claim 11, wherein the restoration step includes contouring the gaspath surface using an automated machine operation.

13. A method of repairing a turbine vane, the turbine vane having at least one platform and a plurality of airfoils, a distance between two of the plurality of airfoils defining a first class area, the at least one platform having a plurality of openings, the method comprising the steps of:
    separating the at least one platform from the plurality of airfoils;
    sealing at least one of the openings in the at least one platform, the plurality of openings including a plurality of airfoil openings corresponding to the plurality of airfoils;
    cutting at least one airfoil socket into the at least one platform, the at least one airfoil socket being cut at a location different from a corresponding airfoil opening; and
    reassembling the vane from the at least one platform and at least one replacement airfoil.

14. The method of claim 13, wherein the reassembled vane comprises a second class area different from the first class area.

* * * * *